United States Patent
Arsenault (10) Patent No.: US 11,565,797 B2
(45) Date of Patent: Jan. 31, 2023

(54) SYSTEMS AND METHODS FOR ANTISKID TOLERANT MULTI-MODE AUTOBRAKE CONTROL

(71) Applicant: GOODRICH CORPORATION, Charlotte, NC (US)

(72) Inventor: Tyler Arsenault, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 985 days.

(21) Appl. No.: 16/361,994

(22) Filed: Mar. 22, 2019

(65) Prior Publication Data
US 2020/0298966 A1 Sep. 24, 2020

(51) Int. Cl.
*B64C 25/46* (2006.01)
*B60T 8/17* (2006.01)
*B60T 8/1755* (2006.01)
*B60T 8/1761* (2006.01)
*B60T 13/66* (2006.01)

(52) U.S. Cl.
CPC .......... *B64C 25/46* (2013.01); *B60T 8/1703* (2013.01); *B60T 8/17551* (2013.01); *B60T 8/17613* (2013.01); *B60T 13/665* (2013.01)

(58) Field of Classification Search
CPC .................................................. B64C 25/26
See application file for complete search history.

(56) References Cited

U.S. PATENT DOCUMENTS

| 9,463,873 | B2 | 10/2016 | Van Deventer et al. |
| 2003/0220731 | A1* | 11/2003 | Zierolf ................ B60T 8/17616 303/121 |
| 2004/0195914 | A1* | 10/2004 | Beck ....................... B60T 8/885 303/191 |

FOREIGN PATENT DOCUMENTS

| EP | 3269604 | 1/2018 |
| EP | 3401173 | 11/2018 |
| EP | 3403892 | 11/2018 |

OTHER PUBLICATIONS

European Patent Office, European Search Report dated Mar. 19, 2020 in Application No. 19214962.3.

\* cited by examiner

*Primary Examiner* — Imran K Mustafa
(74) *Attorney, Agent, or Firm* — Snell & Wilmer L.L.P.

(57) ABSTRACT

A system for multi-mode autobrake control may comprise a wheel speed sensor and a BCU electrically coupled to the wheel speed sensor. A tangible, non-transitory memory may be configured to communicate with the BCU and may have instructions stored thereon that, in response to execution by the BCU, cause the BCU to perform operations comprising receiving a wheel speed signal from the wheel speed sensor, inputting the wheel speed signal into an antiskid filter and a nominal filter, calculating an estimated aircraft deceleration rate, and determining an autobrake pressure command based on the estimated aircraft deceleration rate.

16 Claims, 6 Drawing Sheets

SYSTEMS AND METHODS FOR ANTISKID TOLERANT MULTI-MODE AUTOBRAKE CONTROL

FIELD

The present disclosure relates generally to the field of brake control systems, and more specifically to systems and methods for aircraft brake control.

BACKGROUND

Aircraft typically include a braking system operatively coupled to the wheels of the aircraft for slowing the wheels and the aircraft during, for example, landing or a rejected takeoff. Aircraft braking systems tend to utilize aircraft brake controllers to control various aspects of the braking system. For example, during a braking operation, the brake controllers may switch between a pressure controller and an antiskid controller. In this regard, during braking, a brake command may be issued from the cockpit and the pressure or force applied to the brake is increased, in accordance with the command, to decelerate the wheels and aircraft. If the pressure/force exceeds the braking condition supported by the tire/runway friction, the antiskid controller may become dominant, such that the antiskid controller controls the brake pressure/braking force to prevent or reduce skidding.

Various brake control methodologies are currently designed to operate during a skid condition. These methodologies generally employ increased filtering of the brake pressure and/or wheel speed signals which tend to exhibit increased variation in amplitude during a skid condition (i.e., when the skid controller is dominant). This increased filtering tends to slow the speed and responsiveness of the braking system, particularly, during non-skid conditions when increased filtering may not be needed.

SUMMARY

A system for multi-mode autobrake control is disclosed herein. In accordance with various embodiments, the system may comprise a wheel speed sensor and a brake control unit electrically coupled to the wheel speed sensor. The brake control unit may include an antiskid filter and a nominal filter. A tangible, non-transitory memory may be configured to communicate with the brake control unit. The tangible, non-transitory memory has instructions stored thereon that, in response to execution by the brake control unit, cause the brake control unit to perform operations which may comprise: receiving, by the brake control unit, a wheel speed signal from the wheel speed sensor; inputting, by the brake control unit, the wheel speed signal into the antiskid filter and the nominal filter; calculating, by the brake control unit, an estimated aircraft deceleration rate using at least one of an antiskid signal output from the antiskid filter or a nominal signal output from the nominal filter; and determining, by the brake control unit, an autobrake pressure command based on the estimated aircraft deceleration rate.

In various embodiments, the brake control unit may further comprise a filter switch configured to receive the antiskid signal output from the antiskid filter and the nominal signal output from the nominal filter. An antiskid control module may be configured to output an antiskid active signal to the filter switch.

In various embodiments, the brake control unit may further comprise an autobrake control configured to receive the estimated aircraft deceleration rate and output the autobrake pressure command. In various embodiments, determining the autobrake pressure command may further comprise tuning, by the brake control unit, the estimated aircraft deceleration rate.

In various embodiments, tuning the estimated aircraft deceleration rate may comprise: receiving, by the brake control unit, a reference aircraft deceleration rate; inputting, by the brake control unit, the reference aircraft deceleration rate and the estimated aircraft deceleration rate into a summing node of the autobrake control; sending, by the brake control unit, a signal output from the summing node to a Kp_antiskid tuner, a Kp_nominal tuner, a Ki_antiskid tuner, and a Ki_nominal tuner.

In various embodiments, the autobrake control may further comprise a Kp_switch and a Ki_switch. The Kp_switch may be configured to receive a Kp_antiskid signal output from the Kp_antiskid tuner and a Kp_nominal signal output from the Kp_nominal filter. The Ki_switch may be configured to receive a Ki_antiskid signal output from the Ki_antiskid tuner and a Ki_nominal signal output from the Ki_nominal filter. In various embodiments, the antiskid control module may be configured to output the antiskid active signal to the Kp_switch and the Ki_switch.

In various embodiments, the antiskid filter may comprise a first low pass filter having a first frequency bandwidth, and the nominal filter may comprise a second low pass filter having a second frequency bandwidth greater than the first frequency bandwidth.

A method for multi-mode autobrake control is also disclosed herein. In accordance with various embodiments, the method may comprise: receiving, by a brake control unit, a wheel speed signal from a wheel speed sensor; inputting, by the brake control unit, the wheel speed signal into an antiskid filter and a nominal filter; calculating, by the brake control unit, an estimated aircraft deceleration rate using at least one of an antiskid signal output from the antiskid filter or a nominal signal output from the nominal filter; and determining, by the brake control unit, an autobrake pressure command based on the estimated aircraft deceleration rate.

In various embodiments, the antiskid filter may comprise a first low pass filter having a first frequency bandwidth, and the nominal filter may comprise a second low pass filter having a second frequency bandwidth greater than the first frequency bandwidth.

In various embodiments, calculating the estimated aircraft deceleration rate may further comprise: inputting, by the brake control unit, the antiskid signal output from the antiskid filter and the nominal signal output from the nominal filter into a filter switch; and inputting, by the brake control unit, an antiskid active signal from an antiskid control module into the filter switch.

In various embodiments, determining the autobrake pressure command may further comprise tuning, by the brake control unit, the estimated aircraft deceleration rate. In various embodiments, tuning the estimated aircraft deceleration rate may comprise: receiving, by the brake control unit, a reference aircraft deceleration rate; inputting, by the brake control unit, the reference aircraft deceleration rate and the estimated aircraft deceleration rate into a summing node of an autobrake control; and sending, by the brake control unit, a signal output from the summing node to a Kp_antiskid tuner, a Kp_nominal tuner, a Ki_antiskid tuner, and a Ki_nominal tuner.

In various embodiments, tuning the estimated aircraft deceleration rate may further comprise: inputting, by the brake control unit, a Kp_antiskid signal output from the Kp_antiskid tuner and a Kp_nominal signal output from the Kp_nominal filter into a Kp_switch; inputting, by the brake control unit, a Ki_antiskid signal output from the Ki_antiskid tuner and a Ki_nominal signal output from the Ki_nominal filter into a Ki_switch; and inputting, by the brake control unit, the antiskid active signal from the antiskid control module into the Kp_switch and the Ki_switch.

In various embodiments, the method may further comprise outputting, by the brake control unit, a brake actuator command to an actuation assembly of an aircraft landing gear.

An article of manufacture is also disclosed herein. In accordance with various embodiments, the article includes a non-transitory, tangible computer readable storage medium having instructions stored thereon that, in response to execution by a brake control unit, cause the brake control unit to perform operations which may comprise: receiving, by the brake control unit, a wheel speed signal from a wheel speed sensor; inputting, by the brake control unit, the wheel speed signal into an antiskid filter and a nominal filter; calculating, by the brake control unit, an estimated aircraft deceleration rate using at least one of an antiskid signal output from the antiskid filter or a nominal signal output from the nominal filter; and determining, by the brake control unit, an autobrake pressure command based on the estimated aircraft deceleration rate.

In various embodiments, the antiskid filter may comprise a first low pass filter having a first frequency bandwidth, and the nominal filter may comprise a second low pass filter having a second frequency bandwidth greater than the first frequency bandwidth.

In various embodiments, the operations may further comprise: inputting, by the brake control unit, the antiskid signal output from the antiskid filter and the nominal signal output from the nominal filter into a filter switch; and inputting, by the brake control unit, an antiskid active signal from an antiskid control module into the filter switch.

In various embodiments, determining the autobrake pressure command may further comprise: receiving, by the brake control unit, a reference aircraft deceleration rate; inputting, by the brake control unit, the reference aircraft deceleration rate and the estimated aircraft deceleration rate into a summing node of an autobrake control; and tuning, by the brake control unit, a signal output from the summing node.

In various embodiments, tuning the signal output from the summing node may comprise: sending, by the brake control unit, the signal output from the summing node to a Kp_antiskid tuner, a Kp_nominal tuner, a Ki_antiskid tuner, and a Ki_nominal tuner; inputting, by the brake control unit, a Kp_antiskid signal output from the Kp_antiskid tuner and a Kp_nominal signal output from the Kp_nominal filter into a Kp_switch; inputting, by the brake control unit, a Ki_antiskid signal output from the Ki_antiskid tuner and a Ki_nominal signal output from the Ki_nominal filter into a Ki_switch; and inputting, by the brake control unit, the antiskid active signal from the antiskid control module into the Kp_switch and the Ki_switch.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for filtering and tuning wheel speed signals used by a brake system autobrake control. In accordance with various embodiments, an antiskid filter and an antiskid tuning set may be employed during stable (non-skid) braking conditions, and a nominal filter and a nominal tuning set may be employed during non-stable (skid) braking conditions. In accordance with various embodiments, the system is configured to determine whether to employ the nominal tuning set and filter or the antiskid tuning set and filter based on a state of an antiskid controller. Employing the nominal tuning set and filter may increase tuning speed during stable braking conditions, which may cause signals to converge more quickly and may allow disturbances to be tracked more readily.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 1:
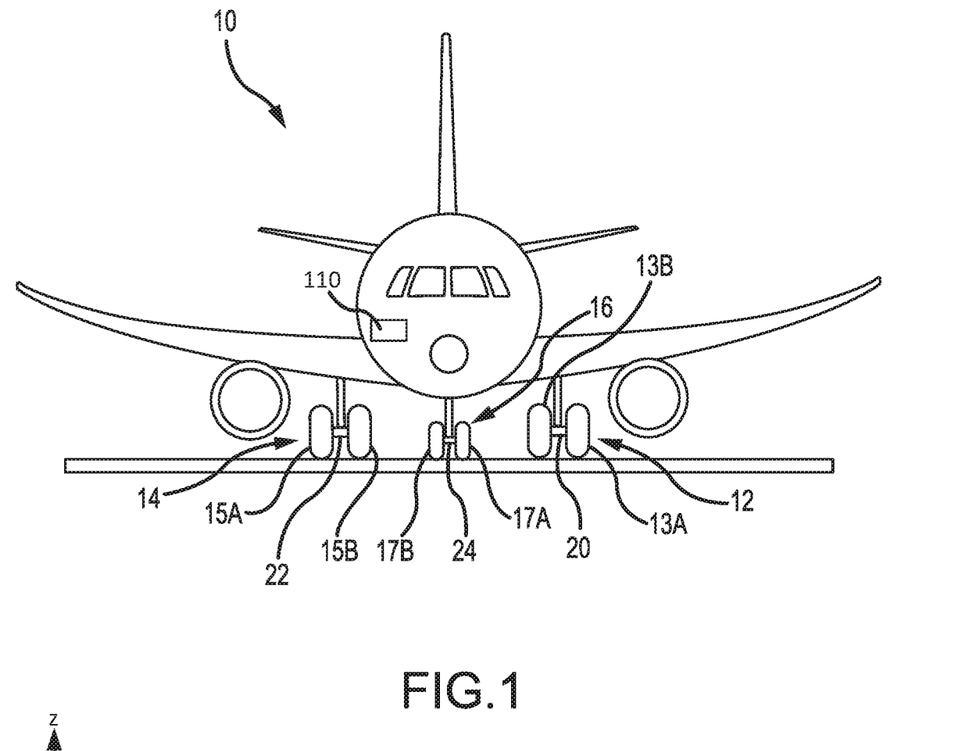
FIG. 1 illustrates an aircraft, in accordance with various embodiments.

With reference to FIG. 1, an aircraft 10 is illustrated, in accordance with various embodiments. Aircraft 10 may include landing gear such as left landing gear 12, right landing gear 14, and nose landing gear 16. Left landing gear 12, right landing gear 14, and nose landing gear 16 may generally support aircraft 10 when aircraft 10 is not flying, allowing aircraft 10 to taxi, take off, and land without damage. Left landing gear 12 may include left outboard (LOB) wheel 13A and left inboard (LIB) wheel 13B coupled by an axle 20. Right landing gear 14 may include right outboard (ROB) wheel 15A and right inboard (RIB) wheel 15B coupled by an axle 22. Nose landing gear 16 may include left nose wheel 17A and right nose wheel 17B coupled by an axle 24. The nose wheels may differ from the main wheels in that the nose wheels may not include a brake. An XYZ axes is used throughout the drawings to illustrate the axial (y), forward (x) and vertical (z) directions relative to axle 22.

Aircraft 10 may comprise a brake control unit (BCU) 110 (also referred as a brake controller) configured to monitor and control the braking of left landing gear 12 and right landing gear 14. Aircraft 10 may include sensors that detect aircraft status information. Aircraft status information may mean information relating to the status of aircraft 10, for example, the presence of weight on wheels, aircraft velocity, aircraft acceleration, landing gear position, wheel position, wheel velocity, wheel acceleration, air temperature, the pressure applied to the brake stack during braking, global positioning system coordinates, and/or the like. BCU 110 may have access to various aircraft status information at any given time.

Figure 2:
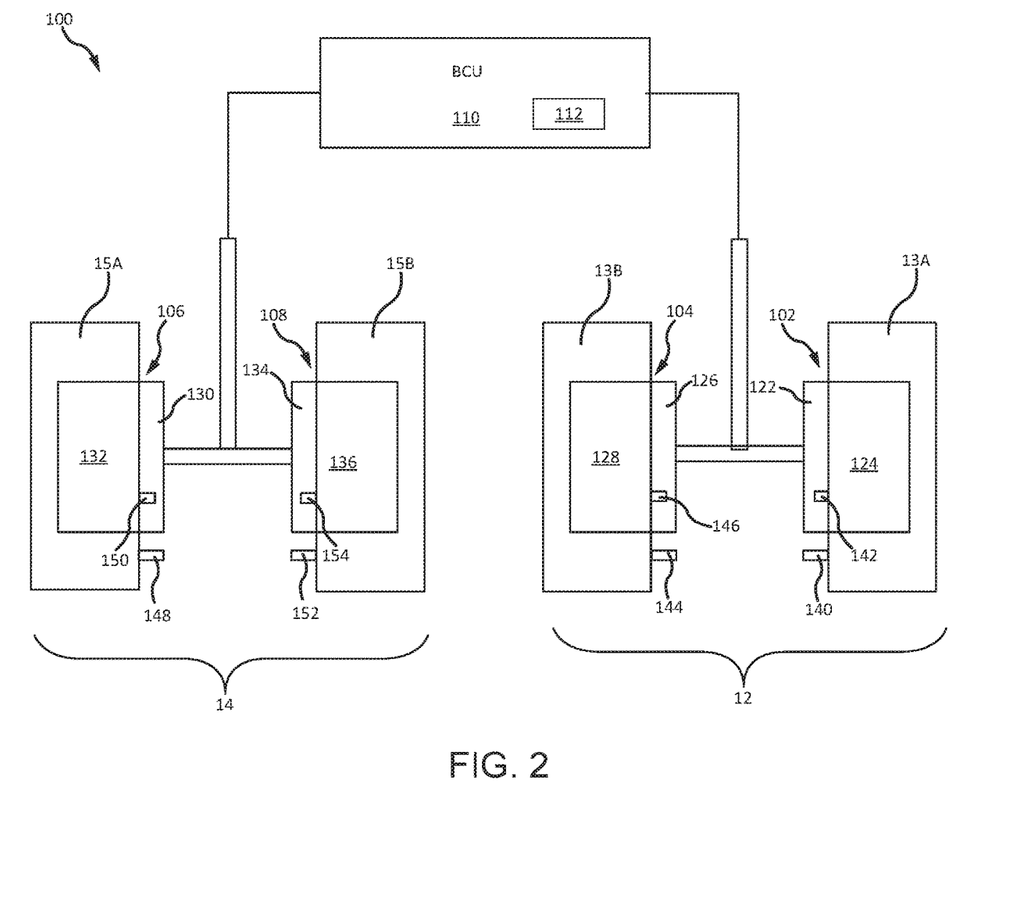
FIG. 2 illustrates a system for multi-mode autobrake control, in accordance with various embodiments.

With reference to FIG. 2, a system 100 for multi-mode autobrake control is illustrated, in accordance with various embodiments. System 100 includes BCU 110. BCU 110 is configured to control braking of left landing gear 12 and right landing gear 14. For example, BCU 110 may be configured to cause a braking force to be applied to the wheels of left and right landing gear 12, 14. In various embodiments, BCU 110 may be configured to send brake pressure commands (i.e., signals corresponding a desired brake pressure) to each of a LOB brake assembly 102 coupled to LOB wheel 13A, a LIB brake assembly 104 coupled to LIB wheel 13B, a ROB brake assembly 106 coupled to ROB wheel 15A, and a RIB brake assembly 108 coupled to RIB wheel 15B. While FIG. 2 illustrates two landing gears (i.e., left landing gear 12 and right landing gear 14) with four total wheels, it is further contemplated and understood that the systems and methods described herein may apply to aircraft comprising any number of landing gears and/or any number of wheels per landing gear.

Brake assemblies 102, 104, 106, 108 may each comprise an actuator assembly configured to apply pressure to a brake stack of the brake assembly. In this regard, LOB brake assembly 102 may include a LOB actuator assembly 122 and a LOB brake stack 124; LIB brake assembly 104 may include a LIB actuator assembly 126 and a LIB brake stack 128; ROB brake assembly 106 may include a ROB actuator assembly 130 and a ROB brake stack 132; and RIB brake assembly 108 may include a RIB actuator assembly 134 and a RIB brake stack 136.

In accordance with various embodiments, BCU 110 may include and communicate with one or more processors and one or more tangible, non-transitory memories 112 and is capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Left and right landing gear 12, 14 may each comprise a plurality of sensors. For example, each brake assembly may include a sensor for detecting a braking pressure or a braking force applied to the respective wheel, and each wheel may include a sensor for detecting a rotational velocity of the respective wheel.

Left landing gear 12 may include a LOB wheel speed sensor 140, a LOB brake sensor 142, a LIB wheel speed sensor 144, and a LIB brake sensor 146. LOB brake sensor 142 may detect a pressure or a force applied to LOB brake stack 124 by LOB actuator assembly 122. LIB brake sensor 146 may detect a pressure or a force applied to LIB brake stack 128 by LIB actuator assembly 126. LOB wheel speed sensor 140 and LIB wheel speed sensor 144 may be coupled to LOB wheel 13A and LIB wheel 13B, respectively, to measure one or more wheel speed characteristic(s) of the wheel. The wheel speed characteristic(s) may comprise a velocity, acceleration, and/or deceleration of the wheel. The wheel speed characteristics may be measured in terms of linear or angular position, linear or angular velocity, linear or angular acceleration, or other measurement unit. In various embodiments, LOB wheel speed sensor 140 and LIB wheel speed sensor 144 may comprise speed sensors that output signals indicative of angular velocity or angular displacement, for example, a Hall effect sensor, variable resistance sensor, or the like.

Right landing gear 14 may include a ROB wheel speed sensor 148, a ROB brake sensor 150, a RIB wheel speed sensor 152, and a RIB brake sensor 154. ROB brake sensor 150 may detect a pressure or a force applied to ROB brake stack 132 by ROB actuator assembly 130. RIB brake sensor 154 may detect a pressure or a force applied to RIB brake stack 136 by RIB actuator assembly 134. ROB wheel speed sensor 148 and RIB wheel speed sensor 152 may be coupled to ROB wheel 15A and RIB wheel 15B, respectively, to measure one or more wheel speed characteristic(s) of the wheel. The wheel speed characteristic(s) may comprise a velocity, acceleration, and/or deceleration of the wheel. The wheel speed characteristics may be measured in terms of linear or angular position, linear or angular velocity, linear or angular acceleration, or other measurement unit. In various embodiments, ROB wheel speed sensor 148 and RIB wheel speed sensor 152 may comprise speed sensors that output signals indicative of angular velocity or angular displacement, for example, a Hall effect sensor, variable resistance sensor, or the like.

In various embodiments, actuator assemblies 122, 126, 130, 134 may include one or more hydraulic and/or pneumatic actuator rams, such that brake sensors 142, 146, 150, 154 may be pressure sensors configured to detect the pressure of the respective hydraulic and/or pneumatic actuator rams. In various embodiments, actuator assemblies 122, 126, 130, 134 may include one or more electromechanical actuator ram. In this regard, brake sensors 142, 146, 150, 154 may be force sensors, such as a load cell, configured to detect a force applied by the electromechanical actuator ram.

The data output from brake sensors 142, 146, 150, 154 and/or from wheel speed sensors 140, 144, 148, 152 may be sent to BCU 110. BCU 110 may use data output from brake sensors 142, 146, 150, 154 and/or wheel speed sensors 140, 144, 148, 152 to determine various conditions of aircraft 10 and/or of left and right landing gear 12, 14. BCU 110 may calculate or estimate a rotational velocity, acceleration, and/or deceleration of each wheel, an estimated velocity, acceleration, and/or deceleration of aircraft, a desired wheel deceleration rate, and/or a desired aircraft deceleration rate. BCU may calculate or estimate a pressure command based on the desired wheel and/or aircraft deceleration rate. BCU 110 may also determine if a wheel is experiencing a skid based on the data output from brake sensors 142, 146, 150, 154 and/or from wheel speed sensors 140, 144, 148, 152.

Figure 3A:
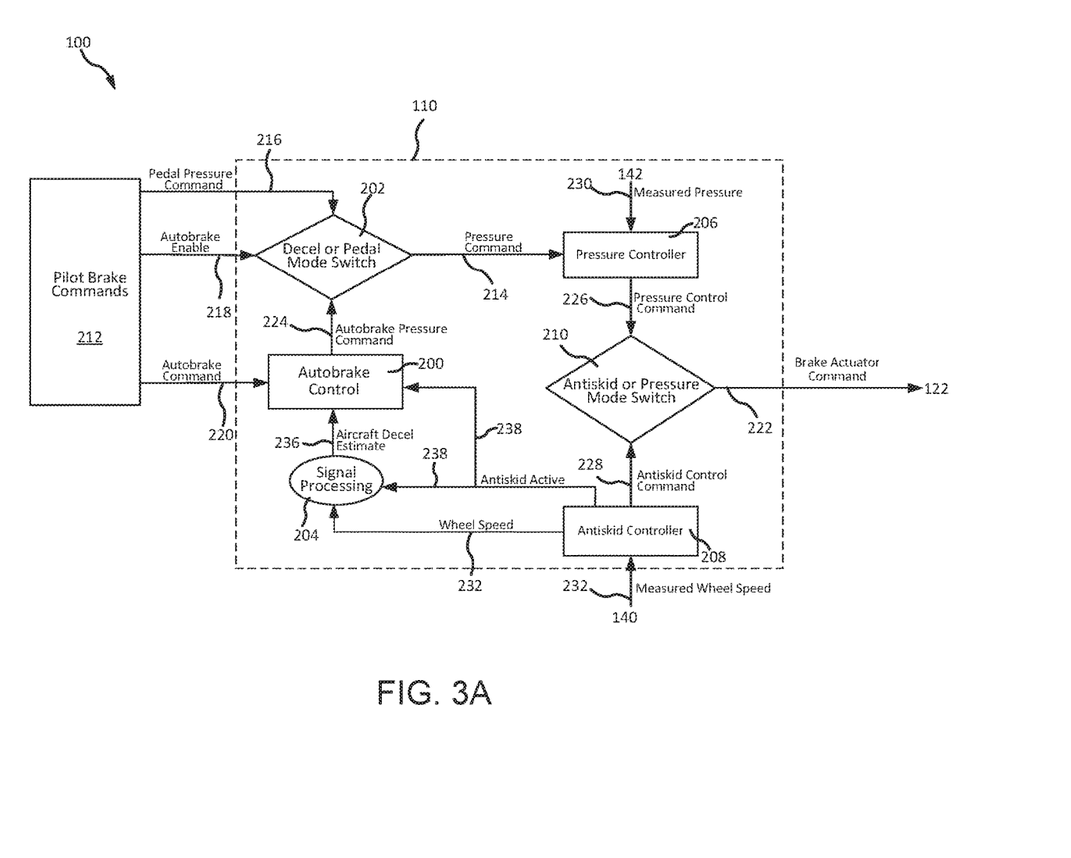
FIGS. 3A and 3B illustrate a schematic of a system for multi-mode autobrake control, in accordance with various embodiments.

With reference to FIG. 3A, additional details of system 100 are illustrated, in accordance with various embodiments. While FIG. 3A illustrates electrical communication between BCU 110 and various components of LOB brake assembly 102 (e.g., LOB brake sensor 142, LOB wheel speed sensor 140, and LOB actuator assembly 122) it is further contemplated and understood that LIB brake assembly 104, ROB brake assembly 106, and RIB brake assembly 108, with momentary reference to FIG. 2, include the elements and functionalities as described herein with respect to LOB brake assembly 102 and communicate with BCU 110 in a similar manner.

In various embodiments, BCU 110 may comprise various brake control modules (e.g., an autobrake control 200, brake control executive switch 202, signal processing unit 204, pressure control module 206, antiskid control module 208, pressure-antiskid switch 210 etc.) for controlling brake assemblies 102, 104, 106, 108, with momentary reference to FIG. 2. BCU 110 may be configured receive pilot brake commands 212 and, in response to the pilot brake commands 212, issue a pressure command 214 which is sent to pressure control module 206. In various embodiments, pilot brake commands 212 may be issued from the cockpit and may include a pedal pressure command 216, an autobrake enabled signal 218, and an autobrake command 220 (also referred to as a reference aircraft deceleration rate 220). In various embodiments, brake control executive switch, or logic, 202 is configured to determine if pressure command 214 should correspond to an autobrake pressure command 224 output from autobrake control 200 or a pedal pressure command 216 corresponding to a pressure applied by the pilot to a brake pedal. For example, if autobrake enabled signal 218 indicates the pilot has turned on the autobrake function, brake control executive switch 202 sends autobrake pressure command 224 as pressure command 214. If autobrake enabled signal 218 indicates the autobrake function is off, brake control executive switch 202 sends pedal pressure command 216 as pressure command 214. In accordance with various embodiments, autobrake control 200 may comprise an automatic braking system, which may be enabled from the cockpit during takeoff and landing. The autobrake system is configured to control the longitudinal deceleration of aircraft 10 with minimal pilot input. The autobrake system may be programmed to determine and or to set a target aircraft deceleration rate. The selection of a deceleration setting (e.g., a low deceleration or a max deceleration) may be done on the aircraft instrument panel. Autobrake command 220 (i.e., the reference or target aircraft deceleration rate) may be based on the deceleration setting selected by the pilot. When autobrake is enabled, the aircraft decelerates at a rate in accordance with the autobrake deceleration setting, as opposed to at a rate corresponding to the pressure applied by the pilot to the brake pedal.

BCU 110 is configured to determine a brake actuator command 222 based on pressure command 214. BCU 110 may send brake actuator command 222 to LOB actuator assembly 122. Upon receiving brake actuator command 222, LOB actuator assembly 122 my adjust the pressure or force applied to LOB brake stack 124 (FIG. 2) to coincide with the brake actuator command 222.

BCU 110 may include a pressure-antiskid switch, or logic, 210 configured to determine if a pressure control command 226 issued from pressure control module 206 or if an antiskid control command 228 issued from antiskid control module 208 should be output as brake actuator command 222. In this regard, during a braking operation, pressure-antiskid switch 210 may switch between pressure control module 206 being dominant and antiskid control module 208 being dominant. Pressure control module 206 receives pressure command 214 and pressure signals 230 from LOB brake sensor 142, and outputs pressure control command 226 based on pressure command 214 and pressure signals 230. Pressure control command 226 is sent to pressure-antiskid switch 210. During a stable braking conditions (i.e., a non-skid event), pressure-antiskid switch 210 outputs pressure control command 226 as brake actuator command 222. LOB actuator assembly 122 receives brake actuator command 222 and adjusts (e.g., increases) the pressure or force applied to LOB brake stack 124 in accordance with the brake actuator command 222 (i.e., in accordance with pressure control command 226).

Antiskid control module 208 is configured to receive wheel speed signals 232 from LOB wheel speed sensor 140 and output an antiskid control command 228 based on wheel speed signals 232. Antiskid control command 228 is sent to pressure-antiskid switch 210. If antiskid control module 208 determines wheel 15A is experiencing a skid (e.g., based on wheel speed signals 232 and/or pressure signals 230), antiskid control module 208 becomes dominant and pressure-antiskid switch 210 outputs antiskid control command 228 as brake actuator command 222. LOB actuator assembly 122 receives brake actuator command 222 and adjusts (e.g., decreases) the pressure or force applied to LOB brake stack 124 in accordance with the brake actuator command 222 (i.e., in accordance with antiskid control command 228).

Wheel speed signal 232 may also be sent from antiskid control module 208 to signal processing unit 204. BCU 110 may determine an estimated aircraft deceleration rate 236 using wheel speed signal 232. BCU 110 may calculate autobrake pressure command 224 using estimated aircraft deceleration rate 236. Antiskid control module 208 may also send an antiskid active signal 238 to signal processing unit 204 and autobrake control 200. An antiskid active signal 238 may be indicative of whether antiskid control module 208 is dominant.

Figure 3B:
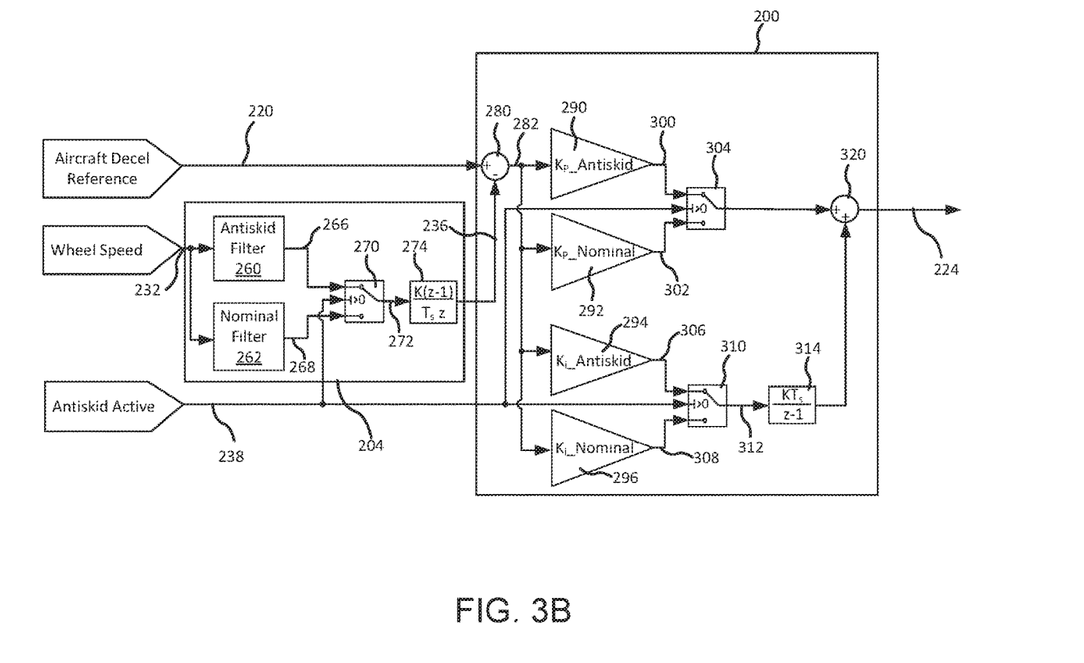

Referring to FIG. 3B, additional details of autobrake control 200 and signal processing unit 204 are illustrated, in accordance with various embodiments. Signal processing unit 204 includes an antiskid (or first) filter 260 and a nominal (or second) filter 262. Antiskid filter 260 and nominal filter 262 receive and filter wheel speed signal 232. Antiskid filter 260 and nominal filter 262 may each include a low pass filter, a moving average filter, or any other suitable filter. In accordance with various embodiments, antiskid filter 260 comprises a smaller allowable bandwidth as compared to nominal filter 262. Stated differently, a frequency bandwidth of nominal filter 262 may be greater than the frequency bandwidth of antiskid filter 260. For example, antiskid filter 260 may be a 0.5 Hz or a 1.0 Hz low pass filter and nominal filter 262 may be a 10 Hz or a 20 Hz low pass filter. In various embodiments, a ratio of the passable frequency limit of antiskid filter 260 to the passable frequency limit of nominal filter 262 may be between 1:10 and 1:40. The greater passable frequency bandwidth of nominal filter 262 allows the wheel speed signal 232 filter by nominal filter 262 to pass, or filter, more quickly as compared to the wheel speed signal 232 filtered by antiskid filter 260.

An antiskid signal 266 output from antiskid filter 260 and a nominal signal 268 output from nominal filter 262 are received by a filter switch 270. Filter switch 270 also receives antiskid active signal 238. Filter switch 270 determines whether to output antiskid signal 266 or nominal signal 268 based on antiskid active signal 238. For example, if antiskid active signal 238 indicates antiskid control module 208 is dominant (i.e., if BCU 110 determines system 100 is operating in a non-stable (i.e., skid) braking condition), filter switch 270 outputs antiskid signal 266. If filter switch 270 determines antiskid control module 208 is not dominant and pressure control module 206 is dominant (i.e., if BCU 110 determines system 100 is operating in a stable (i.e., non-skid) braking condition), filter switch 270 outputs nominal signal 268. The signal 272 output by filter switch 270 is processed by a rate conversion algorithm 274 (e.g., a discrete derivative) to convert signal 272 to an estimated aircraft deceleration rate 236.

In various embodiments, autobrake control 200 performs a tuning operation using the estimated aircraft deceleration rate 236 output from signal processing unit 204. Autobrake control 200 may perform the tuning operation using estimated aircraft deceleration rate 236 and a reference (or target) aircraft deceleration rate 220. For example, in various embodiments, estimated aircraft deceleration rate 236 and reference aircraft deceleration rate 220 may be input into a summing node 280. The Kp and Ki of the signal 282 output from summing node 280 are then tuned. For example, signal 282 is tuned using a Kp_antiskid tuner 290, a Kp_nominal tuner 292, a Ki_antiskid tuner 294, and a Ki_nominal tuner 296.

A Kp_antiskid signal 300 output from Kp_antiskid tuner 290 and a Kp_nominal signal 302 output from Kp_nominal tuner 292 are received by a Kp_switch 304. Kp_switch 304 also receives antiskid active signal 238. Kp_switch 304 determines whether to output Kp_antiskid signal 300 or Kp_nominal signal 302 based on antiskid active signal 238. For example, if antiskid active signal 238 indicates antiskid control module 208 is dominant, Kp_switch 304 outputs Kp_antiskid signal 300. If Kp_switch 304 determines antiskid control module 208 is not dominant (i.e., pressure control module 206 is dominant), Kp_switch 304 outputs Kp_nominal signal 302.

A Ki_antiskid signal 306 output from Ki_antiskid tuner 294 and a Ki_nominal signal 308 output from Ki_nominal tuner 296 are received by a Ki_switch 310. Ki_switch 310 also receives antiskid active signal 238. Ki_switch 310 determines whether to output Ki_antiskid signal 306 or Ki_nominal signal 308 based on antiskid active signal 238. For example, if antiskid active signal 238 indicates antiskid control module 208 is dominant, Ki_switch 310 outputs Ki_antiskid signal 306. If Ki_switch 310 determines antiskid control module 208 is not dominant (i.e., pressure control module 206 is dominant), Ki_switch 310 outputs Ki_nominal signal 308. The signal 312 output by Ki_switch 310 is processed by a rate conversion algorithm 314 (e.g., a discrete time integrator). The Kp_signal 316 output from Kp_switch 304 and the Ki_signal 318 output from Ki_switch may be received by a summing node 320. Summing node 320 may output autobrake pressure command 224. The tuning operation employing Kp_nominal tuner 292 and Ki_nominal tuner 296 may be faster than tuning using Kp_antiskid tuner 290 and Ki_antiskid tuner 294, as the tuning does not have to compensate or account for signal oscillations which may be present when antiskid is in control.

With combined reference to FIGS. 3A and 3B, system 100 may provide faster filtering and tuning during stable braking conditions, which may allow BCU 110 to process signals and calculations based on the signals more quickly, which in turn may allow disturbances to be tracked more readily. For example, BCU 110 may calculate pressure command 214 using wheel speed signal 232 and pilot brake commands 212 (for example, using autobrake pressure command 224). BCU 110 may also use wheel speed signal 232 to monitor the health of LOB brake assembly 102. For example, BCU 110 may compare wheel speed signal 232 from LOB wheel speed sensor 140 to the wheel speed data output from the other wheel speed sensors. BCU 110 may also determine if the reference and/or estimated aircraft deceleration rates coincide with wheel speed signal 232.

Figure 4A:
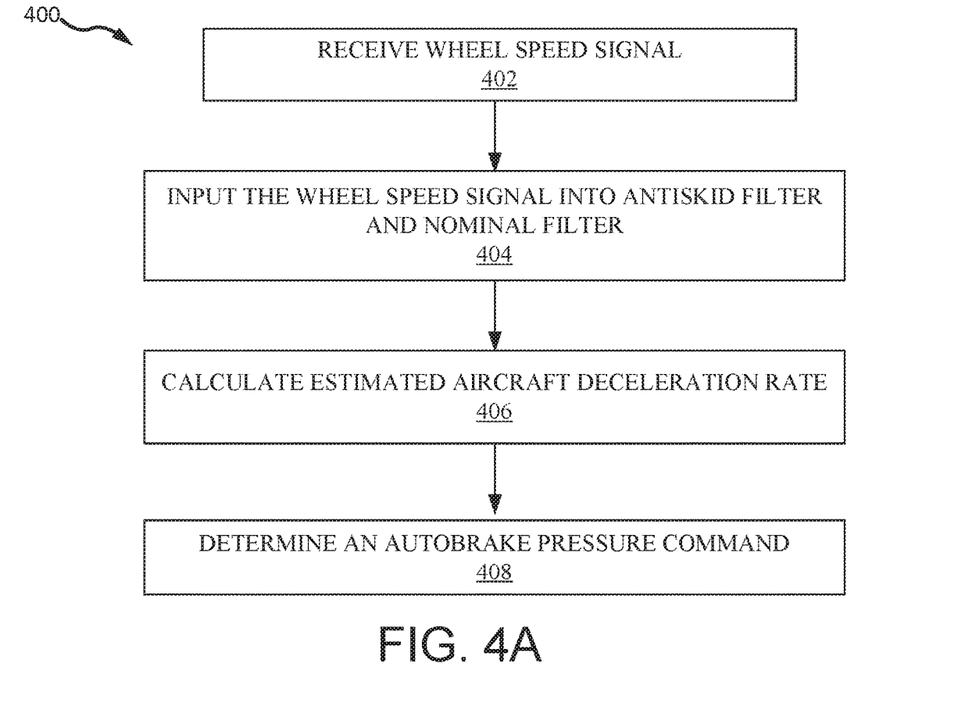
FIGS. 4A, 4B, and 4C illustrate a method for multi-mode autobrake control, in accordance with various embodiments.

FIG. 4A illustrates a method 400 for multi-mode autobrake control. With combined reference to FIG. 4A and FIGS. 3A and 3B, method 400 may receiving, by BCU 110, wheel speed signal 232 from a wheel speed sensor (e.g. LOB wheel speed sensor 140) (step 402), and inputting, by BCU 110, wheel speed signal 232 into antiskid filter 260 and nominal filter 262 (step 404). Method 400 may further include calculating, by BCU 110, estimated aircraft deceleration rate 236 using either antiskid signal 266 output from antiskid filter 260 or nominal signal 268 output from nominal filter 262 (step 406) and determining, by BCU 110, autobrake pressure command 224 based on estimated aircraft deceleration rate 236 (step 408).

Figure 4B:
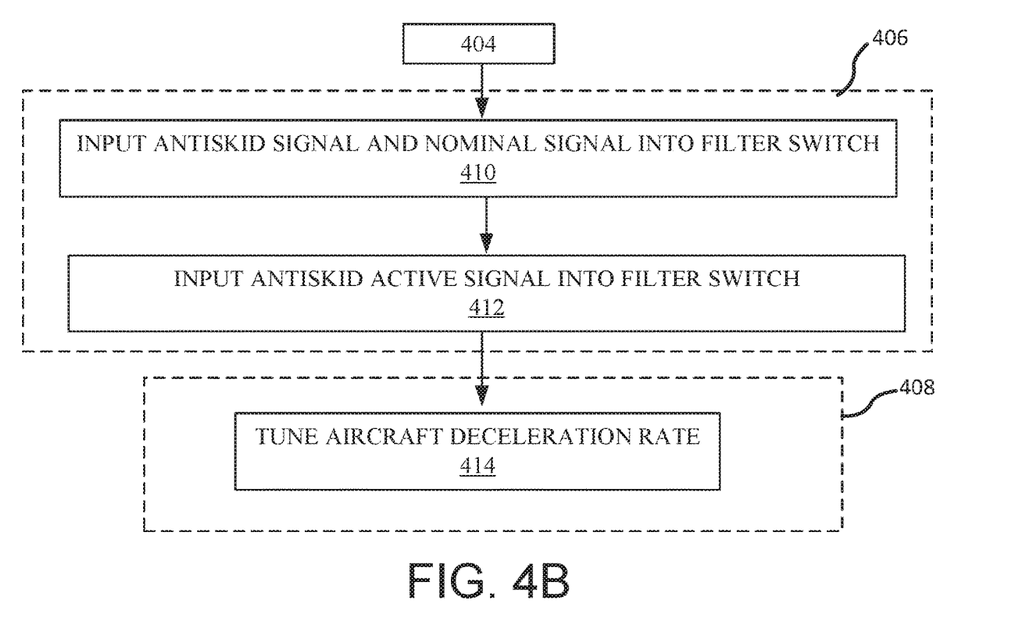

In various embodiments, and with combined reference to FIG. 4B and FIGS. 3A and 3B, step 406 may include inputting, by BCU 110, antiskid signal 266 and nominal signal 268 into filter switch 270 (step 410), and inputting, by BCU 110, antiskid active signal 238 from antiskid control module 208 into filter switch 270 (step 412). In various embodiments, step tuning, by BCU 110, the estimated aircraft deceleration rate 236 (step 414)

Figure 4C:
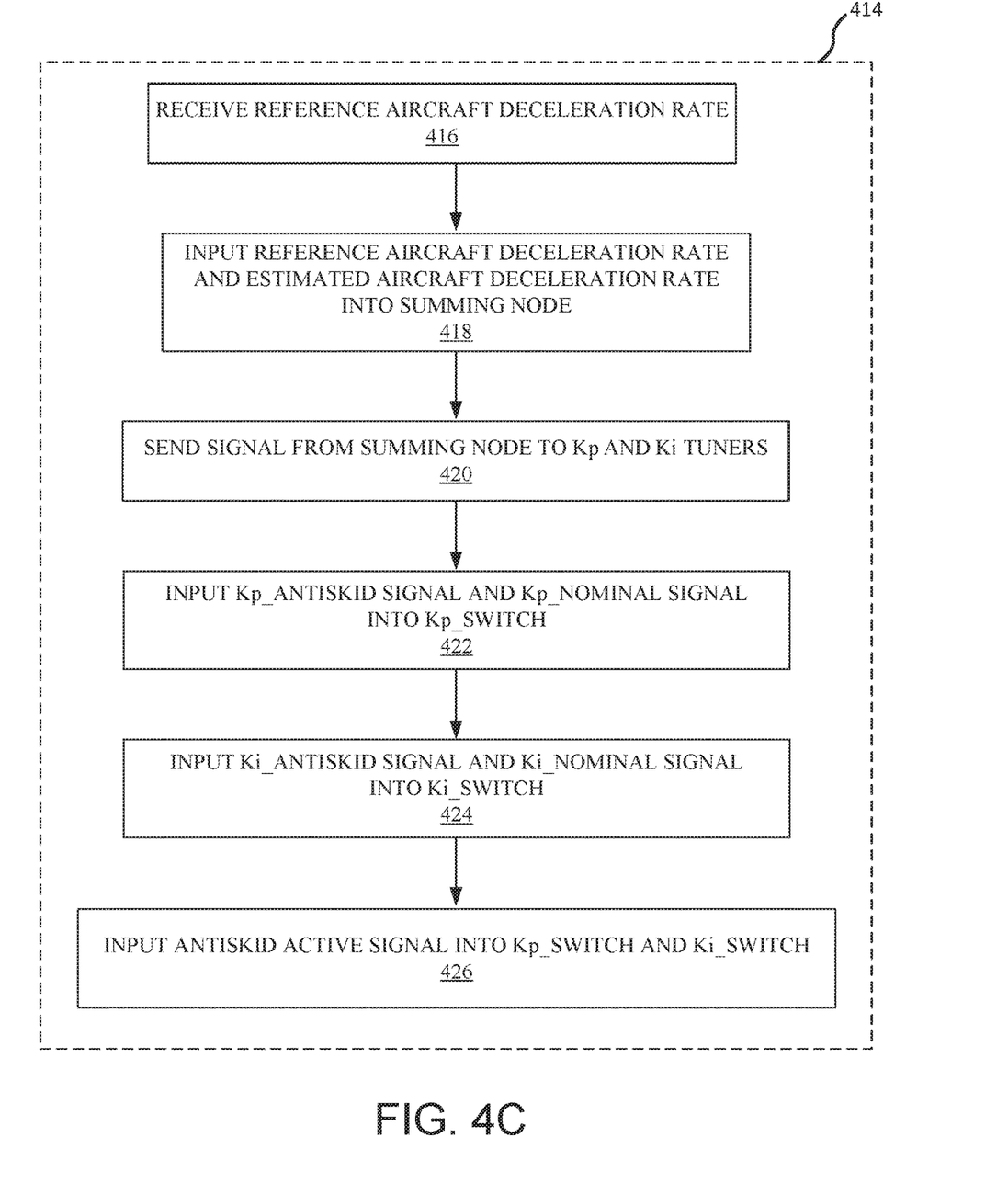

In various embodiments, and with combined reference to FIG. 4C and FIGS. 3A and 3B, step 414 may include receiving, by BCU 110, reference aircraft deceleration rate 220 (step 416), inputting, by BCU 110, reference aircraft deceleration rate 220 and estimated aircraft deceleration rate 236 into summing node 280 of autobrake control 200 (step 418), and sending, by BCU 110, signal 282 output from summing node 280 to Kp_antiskid tuner 290, Kp_nominal tuner 292, Ki_antiskid tuner 294, and Ki_nominal tuner 296 (step 420). In various embodiments, step 414 may further include inputting, by BCU 110, Kp_antiskid signal 300 and Kp_nominal signal 302 into Kp_switch 304 (step 422), inputting, by BCU 110, Ki_antiskid signal 306 and Ki_nominal signal 308 into Ki_switch 310 (step 424), and inputting, by BCU 110, antiskid active signal 238 into Kp_switch 304 and Ki_switch 310 (step 426).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for multi-mode autobrake control, comprising:
   a wheel speed sensor;
   a brake control unit electrically coupled to the wheel speed sensor, the brake control unit including antiskid filter and a nominal filter, wherein the brake control unit further comprises an autobrake control configured to receive an estimated aircraft deceleration rate and output an autobrake pressure command; and
   a tangible, non-transitory memory configured to communicate with the brake control unit, the tangible, non-transitory memory having instructions stored thereon that, in response to execution by the brake control unit, cause the brake control unit to perform operations comprising:
     receiving, by the brake control unit, a wheel speed signal from the wheel speed sensor;
     inputting, by the brake control unit, the wheel speed signal into the antiskid filter and the nominal filter;
     calculating, by the brake control unit, the estimated aircraft deceleration rate using at least one of an antiskid signal output from the antiskid filter or a nominal signal output from the nominal filter; and
     determining, by the brake control unit, the autobrake pressure command based on the estimated aircraft deceleration rate, wherein determining, by the brake control unit, the autobrake pressure command further comprises tuning, by the brake control unit, the estimated aircraft deceleration rate and wherein tuning, by the brake control unit, the estimated aircraft deceleration rate comprises:
       receiving, by the brake control unit, a reference aircraft deceleration rate;
       inputting, by the brake control unit, the reference aircraft deceleration rate and the estimated aircraft deceleration rate into a summing node of the autobrake control; and
       sending, by the brake control unit, a signal output from the summing node to at least one tuner.

2. The system of claim 1, the brake control unit further comprises:
   a filter switch configured to receive the antiskid signal output from the antiskid filter and the nominal signal output from the nominal filter; and
   an antiskid control module configured to output an antiskid active signal to the filter switch.

3. The system of claim 2, wherein
   the at least one tuner is at least one of a Kp_antiskid tuner, a Kp_nominal tuner, a Ki_antiskid tuner, and a Ki_nominal tuner.

4. The system of claim 3, wherein the autobrake control further comprises:
   a Kp_switch configured to receive a Kp_antiskid signal output from the Kp_antiskid tuner and a Kp_nominal signal output from the Kp_nominal filter; and
   a Ki_switch configured to receive a Ki_antiskid signal output from the Ki_antiskid tuner and a Ki_nominal signal output from the Ki_nominal filter.

5. The system of claim 4, wherein the antiskid control module is configured to output the antiskid active signal to the Kp_switch and the Ki_switch.

6. The system of claim 1, wherein the antiskid filter comprises a first low pass filter having a first frequency bandwidth, and wherein the nominal filter comprises a second low pass filter having a second frequency bandwidth greater than the first frequency bandwidth.

7. A method for multi-mode autobrake control, comprising:
   receiving, by a brake control unit, a wheel speed signal from a wheel speed sensor;
   inputting, by the brake control unit, the wheel speed signal into an antiskid filter and a nominal filter;
   calculating, by the brake control unit, an estimated aircraft deceleration rate using at least one of an antiskid signal output from the antiskid filter or a nominal signal output from the nominal filter; and
   determining, by the brake control unit, an autobrake pressure command based on the estimated aircraft deceleration rate, wherein determining, by the brake control unit, the autobrake pressure command further comprises tuning, by the brake control unit, the estimated aircraft deceleration rate and wherein tuning, by the brake control unit, the estimated aircraft deceleration rate comprises:

receiving, by the brake control unit, a reference aircraft deceleration rate;

inputting, by the brake control unit, the reference aircraft deceleration rate and the estimated aircraft deceleration rate into a summing node of an autobrake control; and sending, by the brake control unit, a signal output from the summing node to at least one tuner.

8. The method of claim 7, wherein the antiskid filter comprises a first low pass filter having a first frequency bandwidth, and wherein the nominal filter comprises a second low pass filter having a second frequency bandwidth greater than the first frequency bandwidth.

9. The method of claim 7, wherein calculating, by the brake control unit, the estimated aircraft deceleration rate further comprises:

inputting, by the brake control unit, the antiskid signal output from the antiskid filter and the nominal signal output from the nominal filter into a filter switch; and inputting, by the brake control unit, an antiskid active signal from an antiskid control module into the filter switch.

10. The method of claim 9, wherein
the at least one tuner is at least one of a Kp_antiskid tuner, a Kp_nominal tuner, a Ki_antiskid tuner, and a Ki_nominal tuner.

11. The method of claim 10, wherein tuning, by the brake control unit, the estimated aircraft deceleration rate further comprises:

inputting, by the brake control unit, a Kp_antiskid signal output from the Kp_antiskid tuner and a Kp_nominal signal output from the Kp_nominal filter into a Kp_switch;

inputting, by the brake control unit, a Ki_antiskid signal output from the Ki_antiskid tuner and a Ki_nominal signal output from the Ki_nominal filter into a Ki_switch; and inputting, by the brake control unit, the antiskid active signal from the antiskid control module into the Kp_switch and the Ki_switch.

12. The method of claim 7, further comprising outputting, by the brake control unit, a brake actuator command to an actuation assembly of an aircraft landing gear.

13. An article of manufacture including a non-transitory, tangible computer readable storage medium having instructions stored thereon that, in response to execution by a brake control unit, cause the brake control unit to perform operations comprising:

receiving, by the brake control unit, a wheel speed signal from a wheel speed sensor;

inputting, by the brake control unit, the wheel speed signal into an antiskid filter and a nominal filter;

calculating, by the brake control unit, an estimated aircraft deceleration rate using at least one of an antiskid signal output from the antiskid filter or a nominal signal output from the nominal filter; and determining, by the brake control unit, an autobrake pressure command based on the estimated aircraft deceleration rate, wherein determining, by the brake control unit, the autobrake pressure command further comprises:

receiving, by the brake control unit, a reference aircraft deceleration rate;

inputting, by the brake control unit, the reference aircraft deceleration rate and the estimated aircraft deceleration rate into a summing node of an autobrake control; and tuning, by the brake control unit, a signal output from the summing node.

14. The article of claim 13, wherein the antiskid filter comprises a first low pass filter having a first frequency bandwidth, and wherein the nominal filter comprises a second low pass filter having a second frequency bandwidth larger than the first frequency bandwidth.

15. The article of claim 13, wherein the operations further comprise:

inputting, by the brake control unit, the antiskid signal output from the antiskid filter and the nominal signal output from the nominal filter into a filter switch; and inputting, by the brake control unit, an antiskid active signal from an antiskid control module into the filter switch.

16. The article of claim 15, wherein tuning, by the brake control unit, the signal output from the summing node comprises:

sending, by the brake control unit, the signal output from the summing node to a Kp_antiskid tuner, a Kp_nominal tuner, a Ki_antiskid tuner, and a Ki_nominal tuner;

inputting, by the brake control unit, a Kp_antiskid signal output from the Kp_antiskid tuner and a Kp_nominal signal output from the Kp_nominal filter into a Kp_switch;

inputting, by the brake control unit, a Ki_antiskid signal output from the Ki_antiskid tuner and a Ki_nominal signal output from the Ki_nominal filter into a Ki_switch; and inputting, by the brake control unit, the antiskid active signal from the antiskid control module into the Kp_switch and the Ki_switch.

* * * * *